(No Model.)
G. O. & A. KIRKPATRICK.
DITCHING PLOW.
No. 265,102. Patented Sept. 26, 1882.
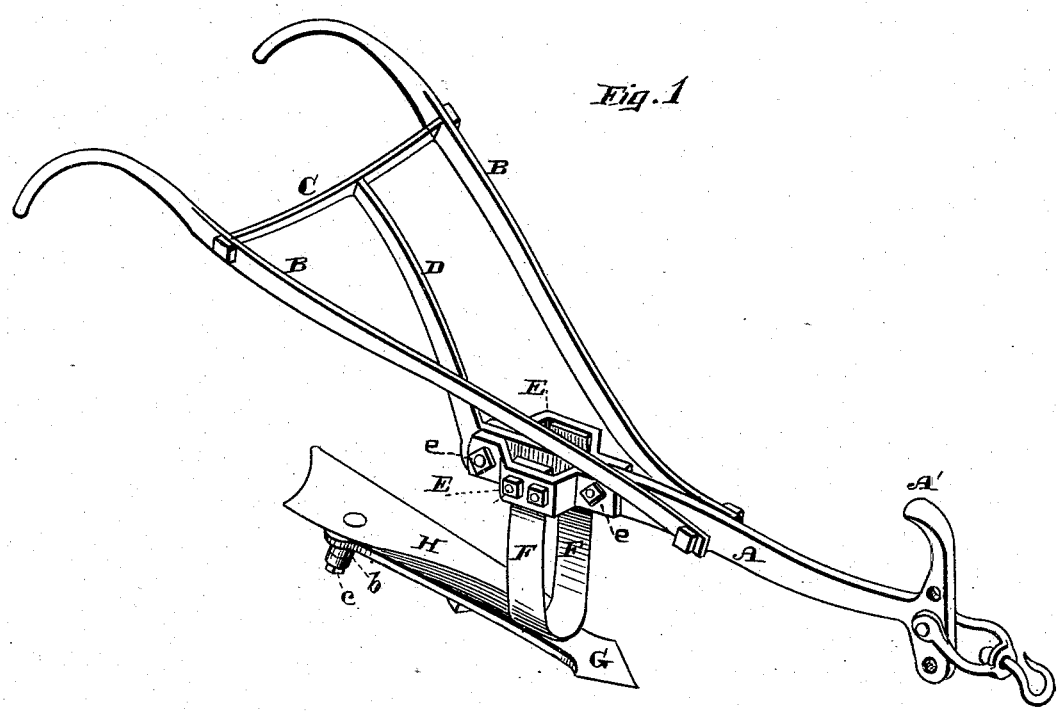
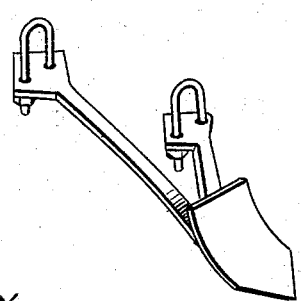
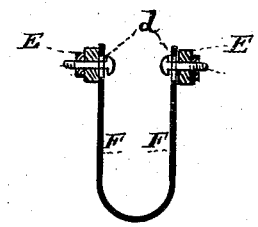

UNITED STATES PATENT OFFICE.

GEORGE O. KIRKPATRICK AND ABRAHAM KIRKPATRICK, OF BRIDGEPORT, CALIFORNIA.

DITCHING-PLOW.

SPECIFICATION forming part of Letters Patent No. 265,102, dated September 26, 1882.

Application filed June 6, 1882. (No model.)

*To all whom it may concern:*

Be it known that we, GEORGE O. KIRKPATRICK and ABRAHAM KIRKPATRICK, of Bridgeport, county of Mono, State of California, have invented an Improved Ditching-Plow; and we hereby declare the following to be a full, clear, and exact description thereof.

Our invention relates to the class of plows, and more especially to those adapted to make a trench, and commonly known as "ditching-plows."

The object of our invention is to provide a plow for ditching and irrigating purposes which will be simple and economical in construction, effective in operation, and easy of transportation.

Our invention consists of certain details of construction, as hereinafter fully described, and specifically pointed out in the claims.

For a more particular explanation reference is hereby made to the following description and the accompanying drawings.

Figure 1 is a perspective. Fig. 2 is a front elevation of the cutting-blade. Fig. 3 shows the shovel-plow attachment.

Let A represent the plow-beam, having bolted about its center upon each side the diverging handles B. These are strengthened by a cross-brace, C, to which a curved central brace, D, is secured. This brace D may be either formed with the beam as an extension from the rear end thereof, or it may be a separate piece and rigidly secured to the rear end of the beam.

E E are brackets or loops upon each side of the back portion of the beam. Their ends are bolted to the beams by bolts *e e* passing through said beam and secured by nuts.

F represents the cutting-blade or share. It consists of a strip of plowshare-steel bent in the shape of the letter U. The upper ends pass inside the brackets E E and are bolted securely thereto. Its forward edges are ground down and form the cutting-edges. Under the bottom of this U-shaped share is a point or nose, G, riveted thereto. Its end projects in front of the share and is sharpened down to a point. It also extends behind the share and is bent upward, as shown.

H represents the mold-board. It is bolted upon the rear portion of the nose, and has an elongated shape, concaved laterally, and slightly flaring to the outer end. It is adapted to throw the sod to one side, here shown as the right side. This mold-board may be rendered adjustable vertically by the thimble *b* and bolt *c* in the end of the nose. This adjustability is for the purpose of adapting the mold-board to the depth of the ditch and thickness of the sod, and is accomplished by placing the thimble between the mold-board and the end of the nose to raise the mold-board or by placing it underneath the nose to lower it. We may render the point of the plow also vertically adjustable by having elongated slots *d* in the upper ends of the U-shaped share, through which the securing-bolts pass.

Formed with or securely attached to the front of the beam A is a projection, A', turned backward and having a broad, flat top. This we call the "shoe" or "runner." It is adapted, when the plow is turned over, to form a bearing-surface, which, together with the rounded surfaces of the handles, enables the plow to be dragged along with facility.

In preparing land for irrigation it is necessary at times to use a shovel-plow as well as a ditching-plow. This frame is adapted specially for this purpose.

By loosening the bolts which secure the brackets or loops E E they with their share and attached parts may be removed, and a shovel-plow, such as is shown in Fig. 3, may be clipped to the beam.

The operation of the device is as follows: The sharp point or nose G penetrates to the depth of the trench, and the sharp edges of the U-shaped blade or share F cut the sod out as the plow advances. The sod passes through the share and falls upon the mold-board H, by which it is thrown out to one side.

Having thus described our invention, what we claim as new, and desire to secure by Letters Patent, is—

1. In a ditching-plow, in combination with beam A, the U-shaped blade or share F, bolted to the beam, the underlying point or nose G, bolted to the share F, and the elongated mold-board H, bolted to the inclined rear portion of the nose G, behind the share, substantially as and for the purpose herein described.

2. In a ditching-plow, the U-shaped share or blade F, bolted to the plow-beam, the nose or point G, bolted to the share F, and having an inclined rear portion, and the elongated mold-board H, secured upon the nose G behind the blade F and rendered adjustable by the bolt $c$, and thimble $b$, substantially as and for the purpose herein described.

3. A ditching-plow consisting of the beam A, handles B, the brackets or loops E E, U-shaped blade or share F, point or nose G, and mold-board H, all arranged and constructed substantially as herein described.

In witness whereof we hereto set our hands.

GEORGE O. $\overset{\text{his}}{\times}$ KIRKPATRICK.
ABRAHAM $\overset{\text{mark}}{\text{KIRKPATRICK}}$.

Witnesses:
 HENRY HAYS,
 GEO. N. WHITMAN.